United States Patent
Inose et al.

(10) Patent No.: US 6,687,308 B1
(45) Date of Patent: Feb. 3, 2004

(54) SIGNAL PROCESSING APPARATUS AND SIGNAL PROCESSING METHOD

(75) Inventors: Kenji Inose, Chiba (JP); Katsumi Oishi, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/623,338
(22) PCT Filed: Jan. 11, 2000
(86) PCT No.: PCT/JP00/00084
§ 371 (c)(1), (2), (4) Date: Aug. 31, 2000
(87) PCT Pub. No.: WO00/42767
PCT Pub. Date: Jul. 20, 2000

(30) Foreign Application Priority Data

Jan. 12, 1999 (JP) .......................................... 11-005730
Jan. 12, 1999 (JP) .......................................... 11-005732

(51) Int. Cl.[7] .............................................. H04L 27/32
(52) U.S. Cl. ...................... 375/260; 455/3.02; 455/13.1; 725/71
(58) Field of Search ................................ 375/260, 220, 375/211, 275, 295, 316; 455/3.02, 3.01, 3.04, 7, 13.1, 20, 131, 132; 725/63, 67, 68, 70, 71; 370/226, 227, 228

(56) References Cited

U.S. PATENT DOCUMENTS 5,864,358 A * 1/1999 Suzuki et al. ............... 725/142
5,936,660 A * 8/1999 Gurantz ........................ 725/71
5,970,386 A * 10/1999 Williams ...................... 725/69
6,040,850 A * 3/2000 Un et al. ....................... 725/68
6,266,813 B1 * 7/2001 Ihara ............................ 725/36
6,480,551 B1 * 11/2002 Ohishi et al. ............... 375/260
6,487,182 B1 * 11/2002 Kitazato ..................... 370/315
6,574,794 B1 * 6/2003 Sarraf .......................... 725/63

FOREIGN PATENT DOCUMENTS

JP       11-150716       6/1999

* cited by examiner

Primary Examiner—Mohammad H. Ghayour
Assistant Examiner—Khanh Cong Tran
(74) Attorney, Agent, or Firm—Lerner, David, Littenberg, Krumholz & Mentlik, LLP

(57) ABSTRACT

The display section 35 connected to a control section 31 displays, at the same time, both the contents described in the network information table of the digital broadcast data demodulated by a demodulator 42 and complying with the first network, and also the contents described in the network information table of the digital broadcast data replaced by an NIT-replacing circuit 48 and complying with the second network. An NIT-detecting circuit 44 detects an NITa from an MPEG2 transport packet, i.e., digital broadcast data in the satellite broadcasting system (first network). The control section 31 complying with a CATV system (second network) generates the data representing at least the transmission frequency of the NITa detected by the NIT-detecting circuit 44. The NIT-replacing circuit 48 replaces the NITa contained in the MPEG2 transport packet, i.e., digital broadcast data in the satellite broadcasting system, with the NITb, thereby generating an MPEG2 transport packet, which will be used as digital broadcast data in the CATV system.

18 Claims, 14 Drawing Sheets

BOARD INFORMATION

NETWORK NAME : AAA

SATELLITE FREQUENCY : 12.538 GHz   CATV FREQUENCY : 333MHz

SERVICE :
- 7 0 8
- 7 3 1
- 7 5 5
- 7 2 1

SERVICE :
- 7 0 8
- 7 3 1
- 7 5 5
- 7 2 1

FIG.12

| SATELLITE FREQUENCY | CATV FREQUENCY |
|---|---|
| 12.658 GHz | 309 MHz |
| 12.538 Ghz | 315 MHz |
| 12.598 GHz | NOT DEFINED |

FIG.14A

| SATELLITE FREQUENCY | SERVICE ID | DELIVERY TO CATV |
|---|---|---|
| 12.658 GHz | 202 | ○ |
| 12.538 GHz | 300 | ○ |
| | 301 | × |
| | 302 | ○ |
| 12.598 GHz | 400 | × |
| | 401 | × |
| | 402 | × |
| | 403 | × |

FIG.14B

SIGNAL PROCESSING APPARATUS AND SIGNAL PROCESSING METHOD

TECHNICAL FIELD

The present invention relates to a signal processing apparatus and a signal processing method, both designed to convert a first digital broadcast having a prescribed transmission frequency on a first network, to a second digital broadcast signal having a prescribed frequency on a second network.

BACKGROUND ART

Cable television companies have been delivering digital broadcast programs from one network to another. For example, they have been receiving the multi-channel broadcast programs via artificial satellites and transmitting the programs to households via the networks.

In this case, the digital broadcast program on the first network cannot be delivered in the second network only if the modulation mode is changed to another by means of a modulator-converter-transimitter or the like. This is because the digital broadcast program has a network information table (NIT) that contains physical data items concerning a transmission path. Further, it is necessary to change the transmission frequency data item and similar data items contained in the NIT of the digital broadcast data, to data items that can be used in the second network.

The NIT contains a program data item, too. A set top box (i.e., household receiver) connected to a cable television transmission path is designed to detect the NIT and receive the program identified by the program data item.

Hence, the NIT of the digital broadcast data delivered in the first network is detected, and the NIT detected is converted so that it may comply with the second network. That is, the NIT of the digital broadcast data delivered in the first network is replaced by an NIT complying with the second network. The digital broadcast data is thereby obtained in the second network.

To deliver a digital program broadcast in a network, in any other network, the contents of the NIT of the digital broadcast data are very important. If the physical data and service data transmitted in a network are not correctly related to those transmitted in another network, digital broadcast programs cannot be delivered appropriately.

DISCLOSURE OF THE INVENTION

Accordingly, an object of this invention is to provide a signal processing apparatus that makes it easy to determine the relation between the physical data and service data transmitted in a first network and the physical data and service data transmitted in a second network.

If the contents of the digital broadcast data transmitted in the first network, such as service data and the number of transport streams to be transmitted, may be changed, the above-mentioned data must be prepared again.

Thus, another object of the invention is to provide a signal processing apparatus and a signal processing method, which can automatically apply changes made in the first network to the second network.

Still another object of this invention is to provide a signal processing apparatus and a signal processing method, which can automatically respond to changes, if any, made in the number of transport streams transmitted from the first network.

Another object of the present invention is to provide a signal processing apparatus and a signal processing method, which can automatically respond to changes, if any, made in the number of service items contained in the digital broadcast data transmitted from the first network.

A signal processing apparatus according to the invention is designed to convert a first digital broadcast having a prescribed transmission frequency on a first network, to a second digital broadcast signal having a prescribed frequency on a second network. The apparatus is characterized by comprising: first frequency-converting means for converting the frequency of the first digital broadcast signal, thereby to generate a first digital modulated signal; demodulating means for demodulating the first digital modulated signal supplied from the first frequency-converting means, thereby to generate digital broadcast data; table-detecting means for detecting a network information table which is physical information about a transmission path, from the digital broadcast data supplied from the demodulating means; table-changing means for changing at least transmission frequency data contained in the network information table detected by the table-detecting means, to data that complies with the second network; table-replacing means for replacing the network information table supplied from the demodulating means, with the network information table supplied from the table-changing means; display means for displaying the contents described in the network information table of the digital broadcast data supplied from the demodulating means and complying with the first network, and also the contents described in the network information table of the digital broadcast data replaced by the table-changing means and complying with the second network; modulating means for modulating the digital broadcast data whose network information table has been replaced by the table-replacing means, thereby to generate a second digital modulated signal; and second frequency-converting means for converting the frequency of the second digital broadcast signal, thereby to generate the second digital broadcast signal.

In the signal processing apparatus according the invention, the display means displays the contents described in the network information table of the digital broadcast data complying with, for example, the first network, along with the contents described in the network information table of the digital broadcast data complying with the second network.

Another signal processing apparatus according to this invention is designed to convert a first digital broadcast having a prescribed transmission frequency on a first network, to a second digital broadcast signal having a prescribed frequency on a second network. This apparatus is characterized by comprising: first frequency-converting means for converting the frequency of the first digital broadcast signal, thereby to generate a first digital modulated signal; demodulating means for demodulating the first digital modulated signal supplied from the first frequency-converting means, thereby to generate digital broadcast data; table-detecting means for detecting a network information table which is physical information about a transmission path, from the digital broadcast data supplied from the demodulating means; analyzing means for analyzing information about the first network, on the basis of the network information table detected by the table-detecting means; comparing means for comparing the information about the first network analyzed by the analyzing means, with the previous information about the first network; table-changing means for changing the network information table of the first network to one that complies with the second network, on the basis of the information about the first network, which has been generated as results of comparison accomplished by the comparing means; table-replacing means for replacing the network information table supplied from the demodulating means, with the network information table supplied from the table-changing means; modulating means for modulating the digital broadcast data whose network information table has been replaced by the table-replacing means, thereby to generate a second digital modulated signal; and second frequency-converting means for converting the frequency of the second digital broadcast signal, thereby to generate the second digital broadcast signal.

A signal processing method according to the present invention is designed to convert a first digital broadcast having a prescribed transmission frequency on a first network, to a second digital broadcast signal having a prescribed frequency on a second network. The method is characterized by comprising: a first frequency-converting step of converting the frequency of the first digital broadcast signal, thereby to generate a first digital modulated signal; a demodulating step of demodulating the first digital modulated signal generated in the first frequency-converting step, thereby to generate digital broadcast data; a table-detecting step of detecting a network information table which is physical information about a transmission path, from the digital broadcast data generated in the demodulating step; analyzing step of analyzing information about the first network, on the basis of the network information table detected in the table-detecting step; comparing step of comparing the information about the first network analyzed by in the analyzing step, with the previous information about the first network; table-changing step of changing the network information table of the first network to one that complies with the second network, on the basis of the information about the first network, which has been generated as results of comparison accomplished in the comparing step; table-replacing step of replacing the network information table generated in the demodulating step, with the network information table generated in the table-changing step; modulating step of modulating the digital broadcast data whose network information table has been replaced in the table-replacing step, thereby to generate a second digital modulated signal; and second frequency-converting step for converting the frequency of the second digital broadcast signal, thereby to generate the second digital broadcast signal.

BRIEF DESCRIPTION OF THE DRAWINGS

FIG. 12 is a diagram representing some of the contents in the NIT, displayed by the display section of the modulator-converter-transmitter;

FIGS. 14A and 14B are diagrams showing the satellite frequencies set in the NIT by the modulator-converter-transmitter and the satellite-CATV frequency table and delivery service, respectively.

BEST MODE FOR CARRYING OUT THE INVENTION

The best mode for carrying out the invention will be described in detail, with reference to the accompanying drawings.

Figure 1:
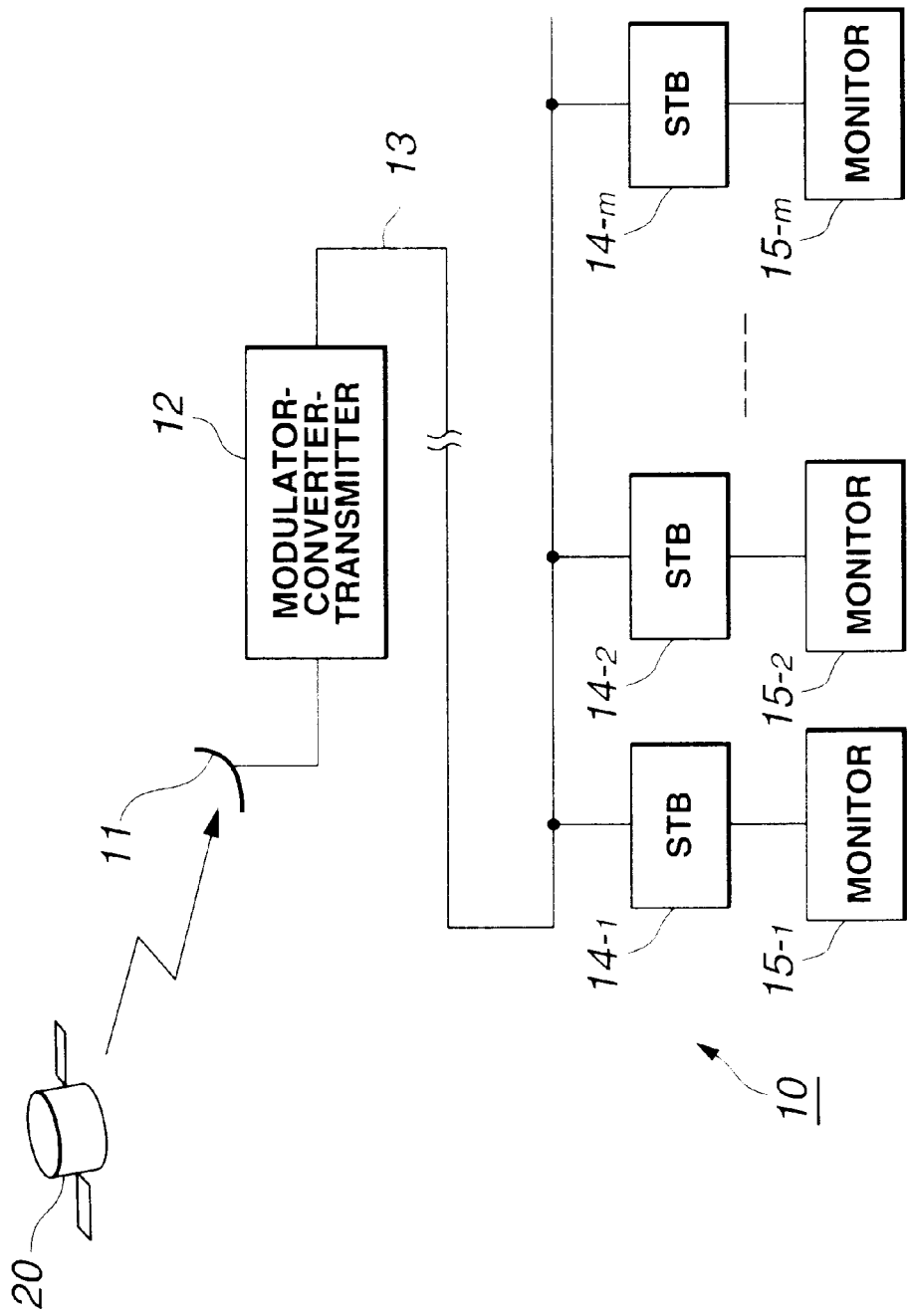
FIG. 1 is a block diagram illustrating a digital CATV system to which the present invention is applied.

This invention is applied to, for example, a digital CATV (Cable Television) system 10 having the structure shown in FIG. 1. The CATV system 10 comprises an antenna 11, a modulator-converter-transmitter 12, a transmission path 13, and set top boxes (household receiver) 14-1 to 14-m. The antenna 11 receives digital broadcast signals from the transponders (satellite relays) provided in a satellite 20. The modulator-converter-transmitter 12 changes the transmission frequencies, modulation modes and the like of the digital broadcast signals, thereby generating CATV digital broadcast signals, and transmits the CATV broadcast signals to the transmission path 13. The set top boxes (household receiver) 4-1 to 4-m are connected to the transmission path 13.

Figures 2A, 2B:
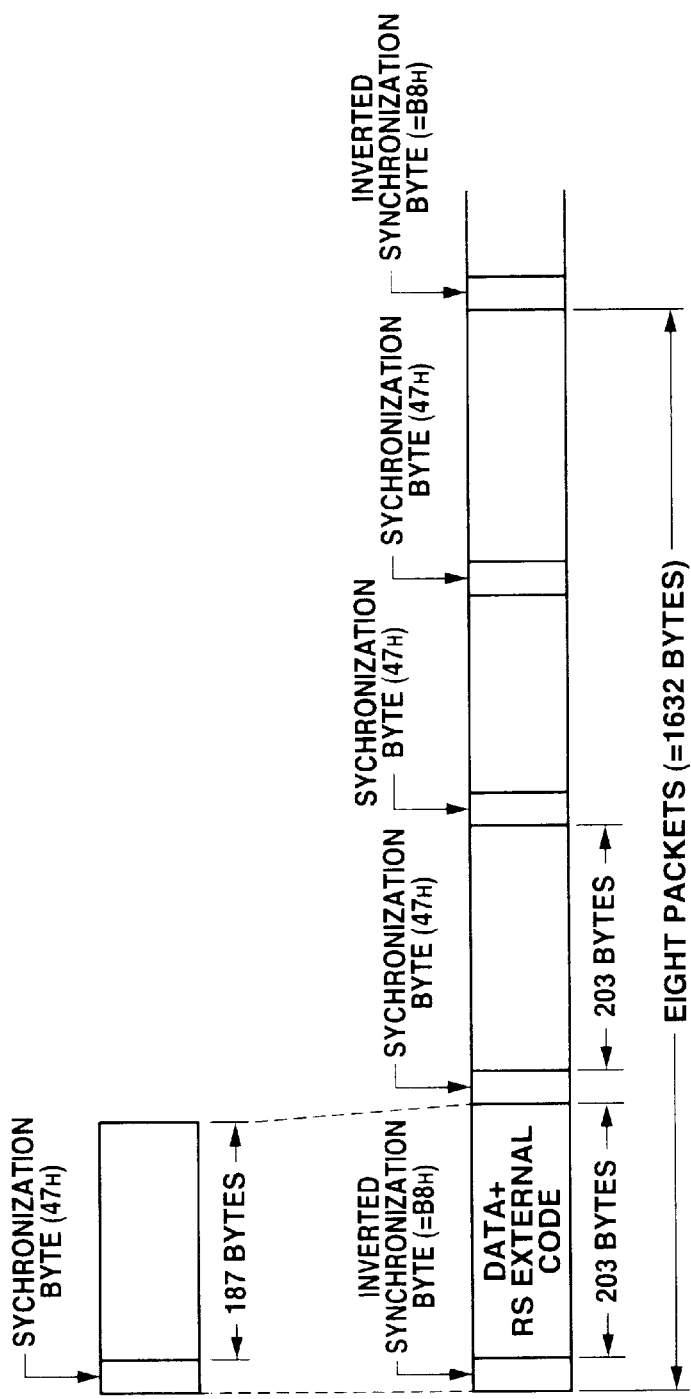
FIGS. 2A and 2B are diagrams showing the frame structure of an MPEG2 transport packet and the frame structure of a DVB system.

The digital broadcast signals the satellite 20 transmits will be described. In the present embodiment, the digital broadcast signals comply with the DVB (Digital Video Broadcasting) system, i.e., the digital broadcasting standards adopted in Europe. FIG. 2B depicts the frame structure of the digital broadcast data complying with the DVB system. One frame is composed of eight transport packets (see FIG. 2A). In this case, each packet has a synchronization byte (=47H). One synchronization byte is inverted to B8H, thereby achieving the synchronization of the frame. Each MPEG2 transport packet (i.e., MPEG2 packet) contains a error-correcting code of Read Solomon (204, 188). The digital broadcast data shown in FIG. 2B is subjected first to QPSK (Quadrature Phase Shift Keying) modulation and then to frequency modulation. The data is thereby converted to digital broadcast signals of 27 MHz, which are transmitted from the satellite 20.

Figure 3:
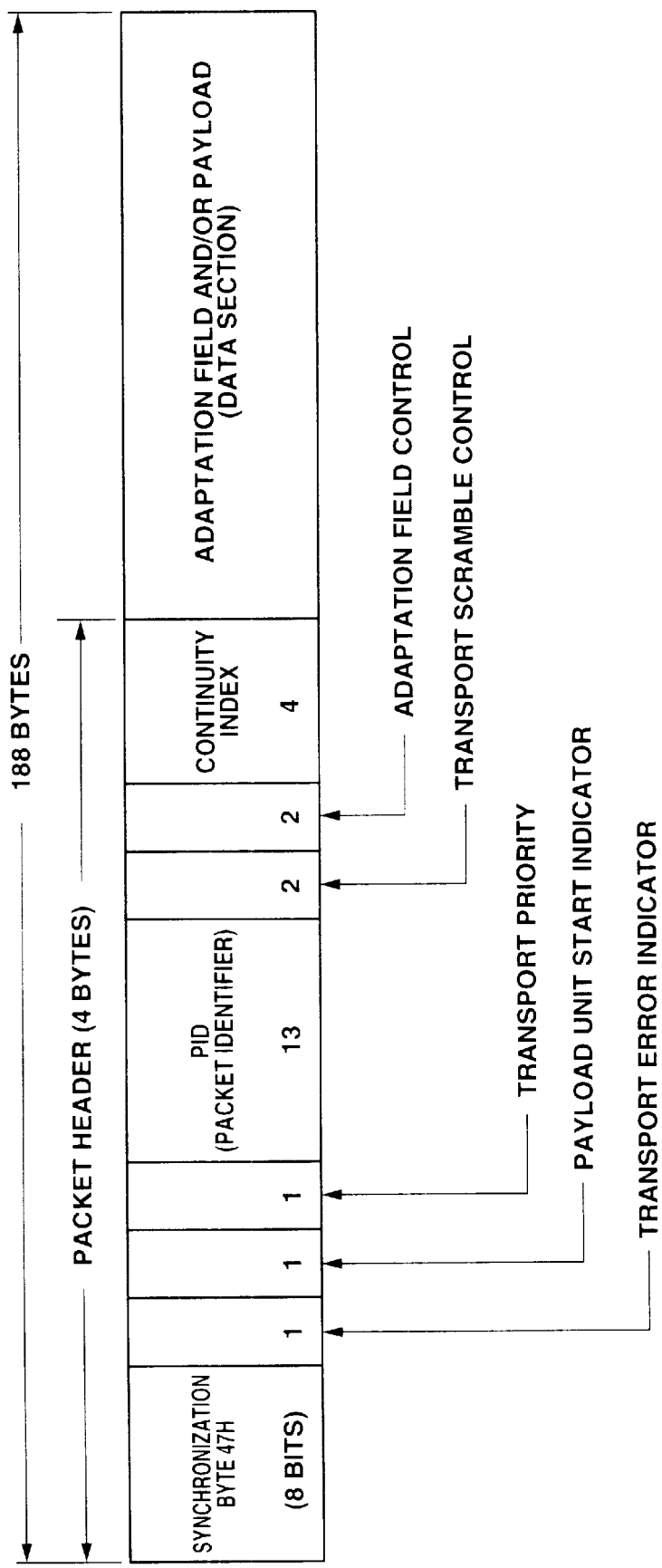
FIG. 3 is a diagram depicting the structure of an MPEG2 packet.
Figure 4:
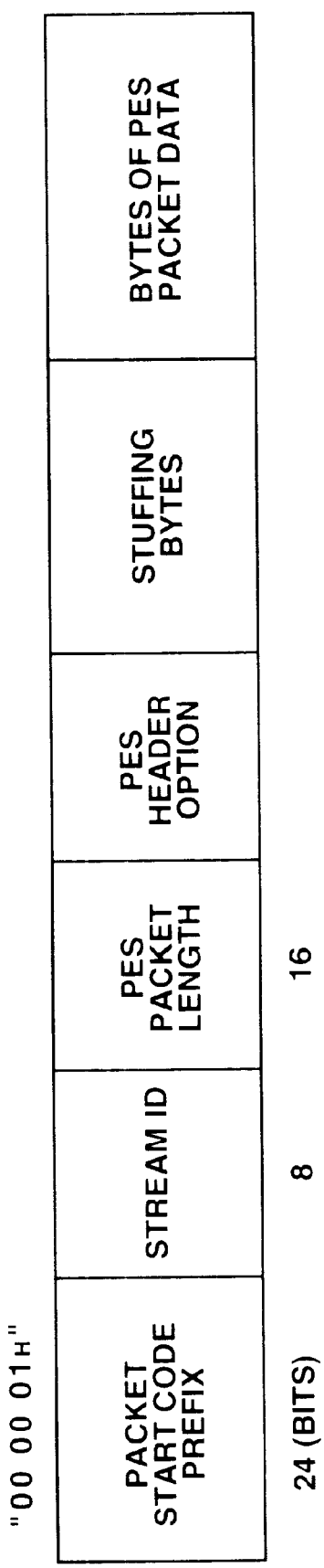
FIG. 4 is a diagram showing the structure of a PES packet.

FIG. 3 shows the structure of an MPEG2 transport packet that consists of 188 bytes. Of these bytes, the first four bytes constitute the packet header. The packet header describes PID (Packet Identification), or a packet identifier, which indicates the attribute of the stream (i.e., data stream) of the packet. As is known in the art, the payload (data section) of the MPEG2 transport packet contains a PES packet having the structure shown in FIG. 4. The PES packet is divided into 184-byte data items. The MPEG2 packet further contains PSI (Program Specific Information) that includes tables such as a PAT (Program Association Table), a PMT (Program Map Table) and an NIT (Network Information Table). These tables are provided in the form of sections.

Figure 5:
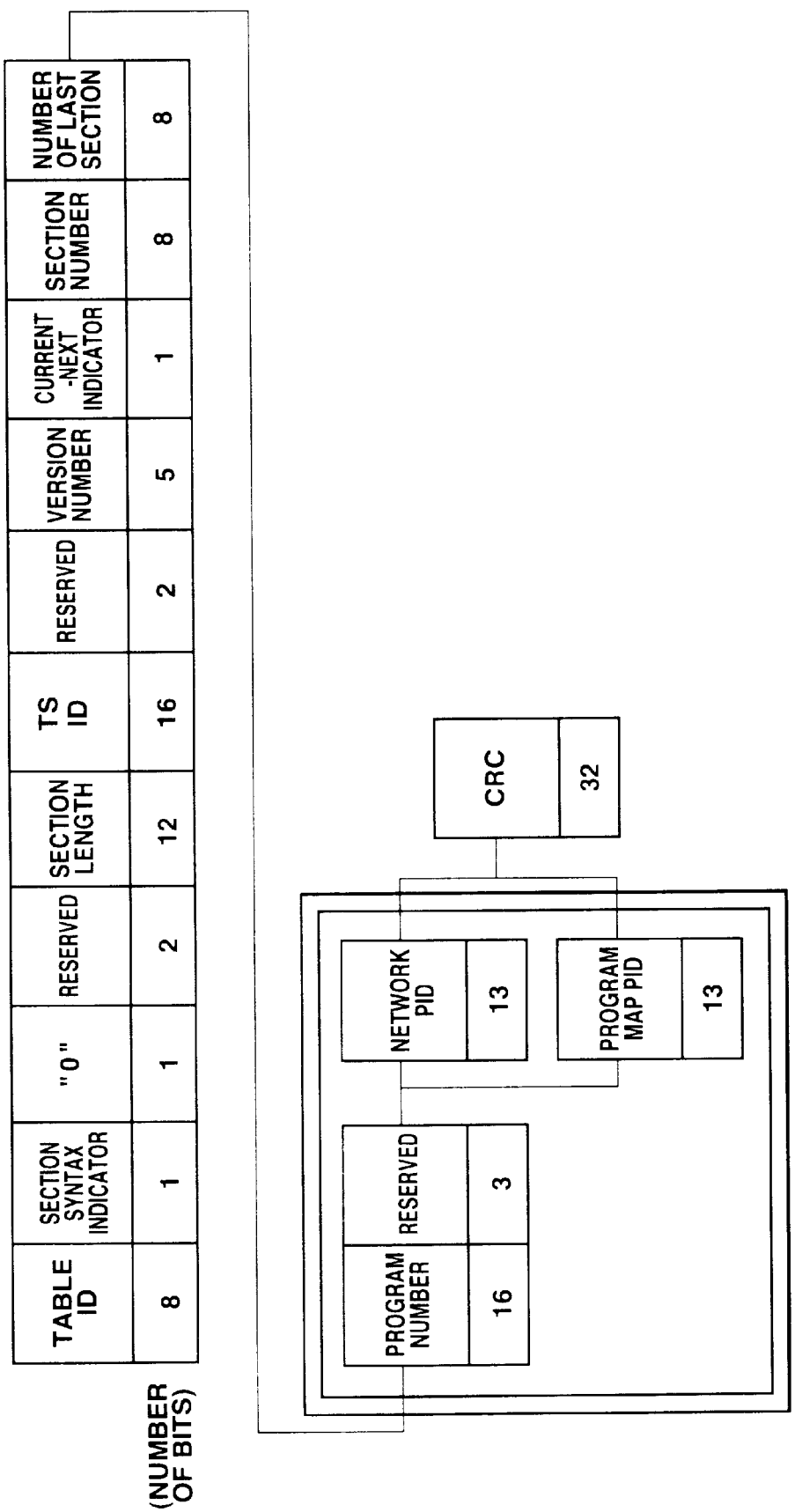
FIG. 5 is a diagram showing the structure of a program association table (PAT)

PSI is information that is required for easy selection of a station and a program. PAT represents the PID of PMT that is used to transmit the packet constituting each program labeled with a program number (16 bits). FIG. 5 shows the structure of the PAT. The PID assigned to the PAT is "0", which is a fixed identifier.

The contents of PSI will be described. Table ID indicates the type of the table. It is "0x00" (in hexadecimal notation), identifying the PAT. TS (Transport Stream) ID identifies the stream (multiplexed coded data) and is equivalent to a transponder in the case of satellite broadcasting. Version number is added every time the table contents are updated. Current-next indicator is used to identify the new version and the old version which are transmitted at the same time. Program number identifies a channel. Network ID indicates the PID of NIT when it is "0x0000". Program map PID identifies the PID of MPT.

Figure 6:
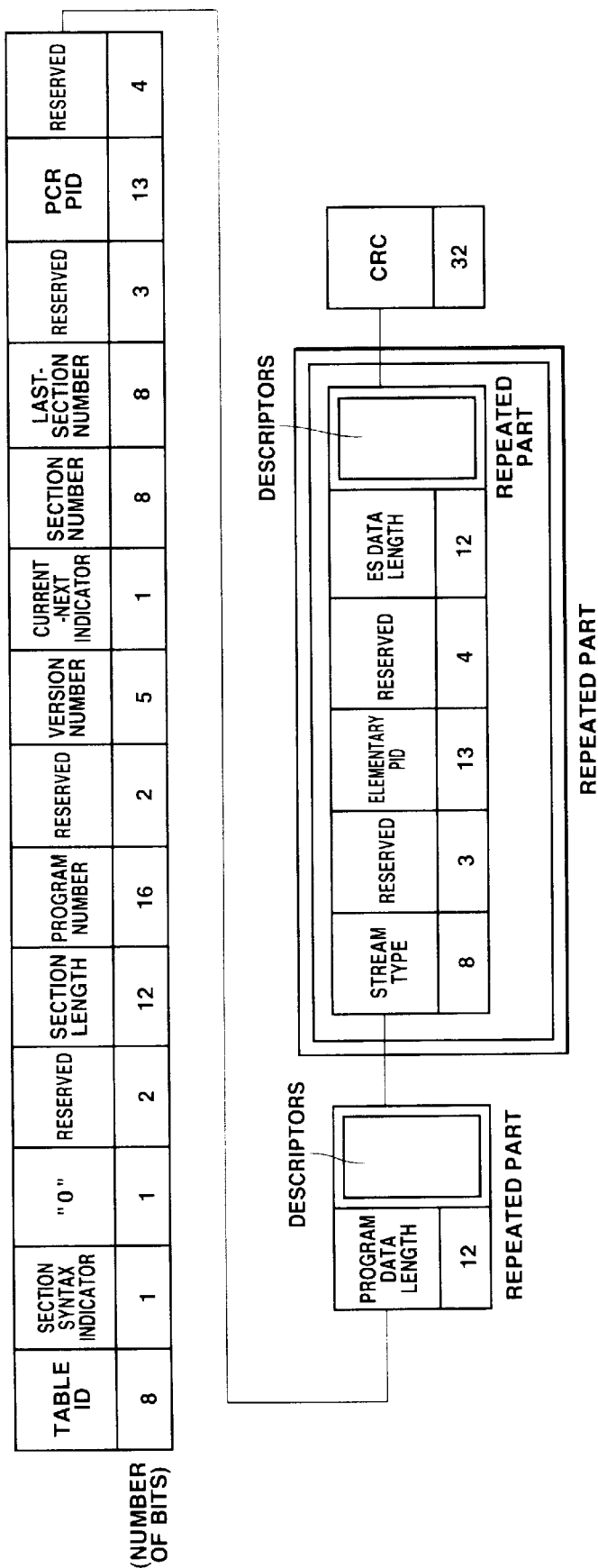
FIG. 6 is a diagram depicting the structure of a program map table (PMT)

PMT indicates the PID of the packet that contains the data stream including the video data, audio data, added data and the like which constitute the program identified by a program number. The PID of PMT is designated by PAT, as described above. FIG. 6 depicts the structure of PMT. Those contents of PMT which differ from the contents of PAT will be explained. Table ID describes the type of the table. It is "0x02", identifying the PMT. PCR PID indicates the PID of the packet that contains PCR (Program Clock Reference) showing a clock signal that will be used to demodulate data. Stream type designates the type of signals to be transmitted in the form of a data stream that includes video data, audio data added data and the like.

NIT indicates the physical data about the transmission path. In the case of satellite broadcasting, the physical data represents the orbit of the satellite, the polarized waves the satellite transmits, the frequencies for the transponders provided in the satellite, and the like. The PID of NIT is designated by PAT, as mentioned above.

Figure 7:
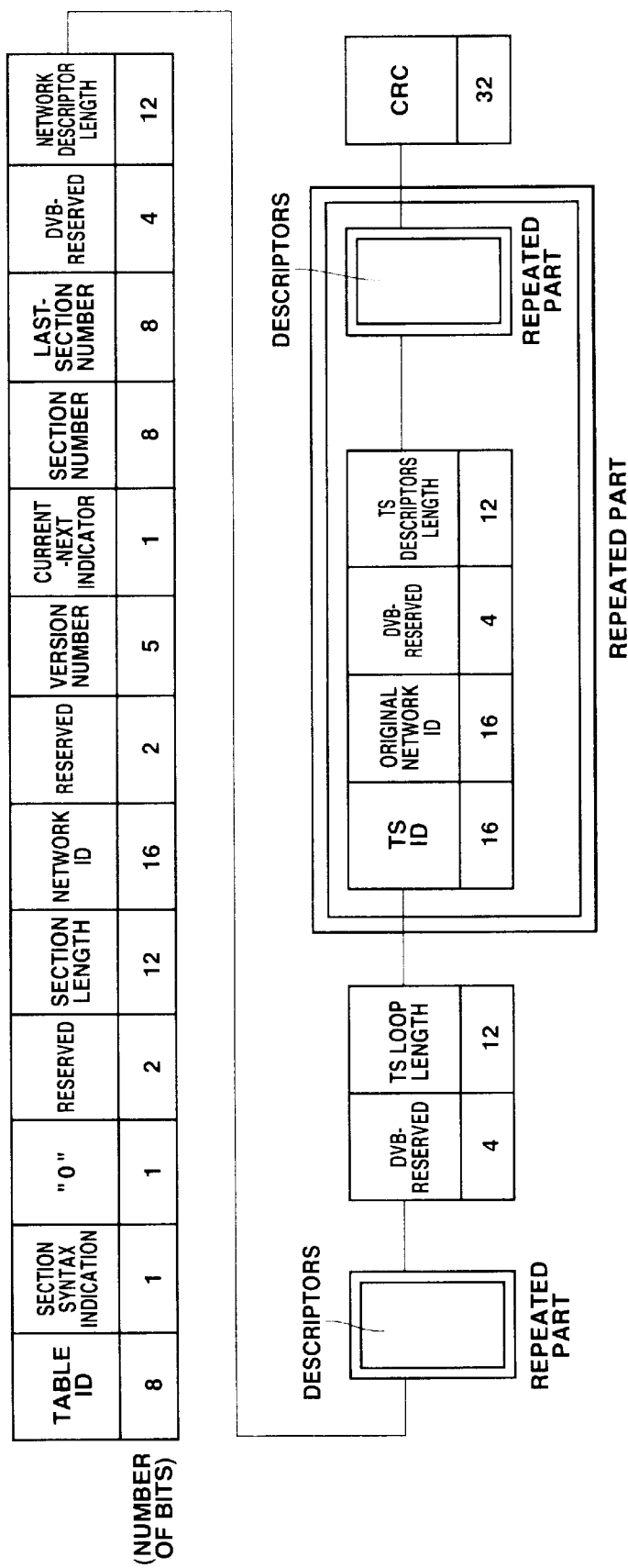
FIG. 7 is a diagram illustrating the structure of a network information table (NIT)

FIG. 7 illustrates the structure of the NIT. Table ID indicates the type of the table. When the table ID is "0x40", it designates the network. When it is "0x41", it designates the next network. Section syntax indicator shows whether the NIT is composed of a single section or a plurality of sections. Section length indicates the total length of data that follows it. Network ID identifies the network and corresponds to an individual satellite in the case of satellite broadcasting. Version number is incremented whenever the contents of the NIT are changed. Current-next indicator shows whether the section is valid or not at present. Section number specifies the number assigned to the current section. Last-section number indicates the number assigned to the last of the sections that constitute one table. Network descriptor length indicates the length of the data that follows it. TS loop length specifies the length of the TS loop that immediately follows it. TSID is a code identifying the TS and corresponds to one transponder (27-MHz band) in the case of satellite broadcasting or one channel (6-MHz band) in the case of a CATV system. Original network ID specifies the source network from which a digital broadcast signal is transmitted to the network. TS descriptor length indicates the total data length of the TS descriptors which are described immediately after it.

The TS descriptors that play an important role in the NIT will be explained.

First, the satellite-delivery system descriptor will be described. This descriptor is used in the NIT in the digital satellite broadcasting.

Figure 8:
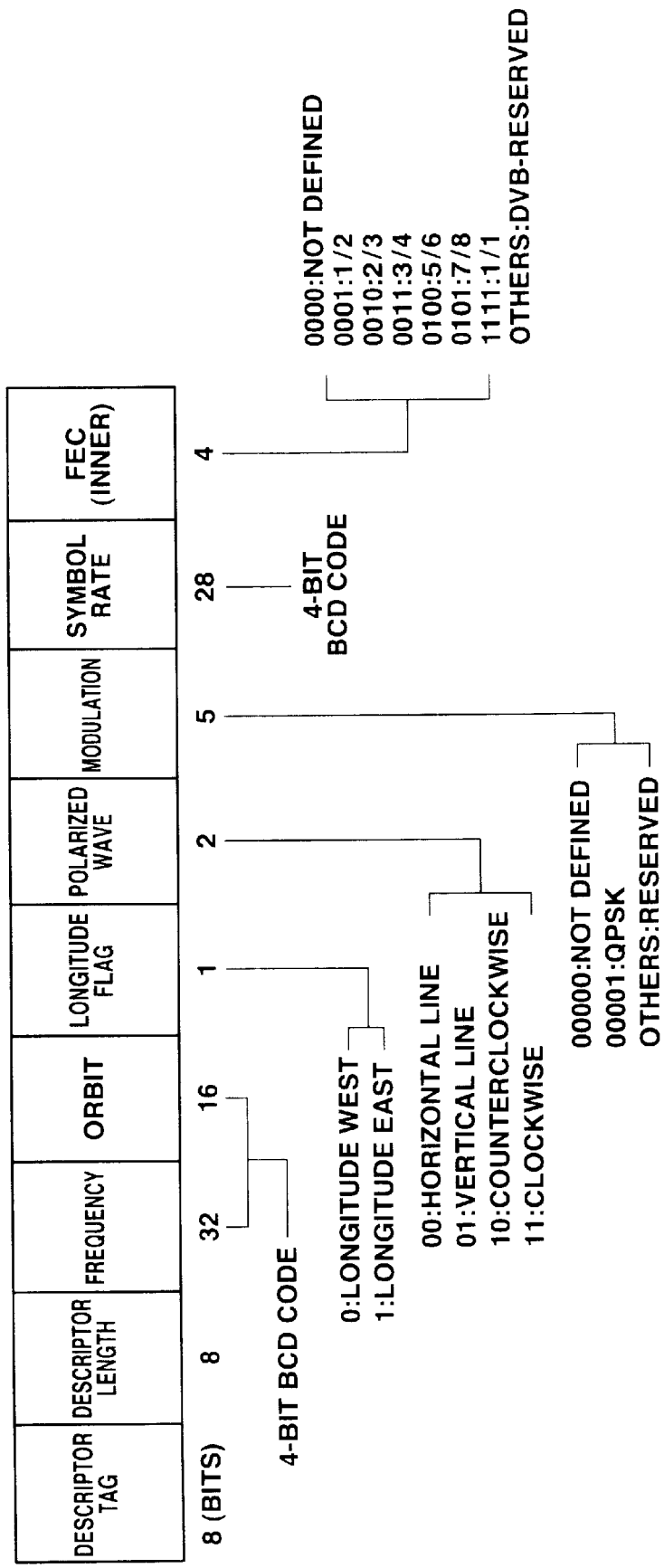
FIG. 8 is a diagram showing the structure of the satellite-delivery system descriptor.

FIG. 8 shows the structure of the satellite-delivery system descriptor. Descriptor tag is defined in the DVB system and specifies the type of the descriptor. The tag is "0x43" in this descriptor. Frequency indicates the transmission frequency for a stream (a transponder in the case of the satellite broadcasting). Orbit and longitude show the orbit of the satellite. Polarized wave indicates the polarized waves emitted from the satellite. Demodulation, symbol rate and frequency of error connection of internal codes show the specification of the transmission system used.

The cable-delivery descriptor will now be described. This descriptor is used in the digital CATV system.

Figure 9:
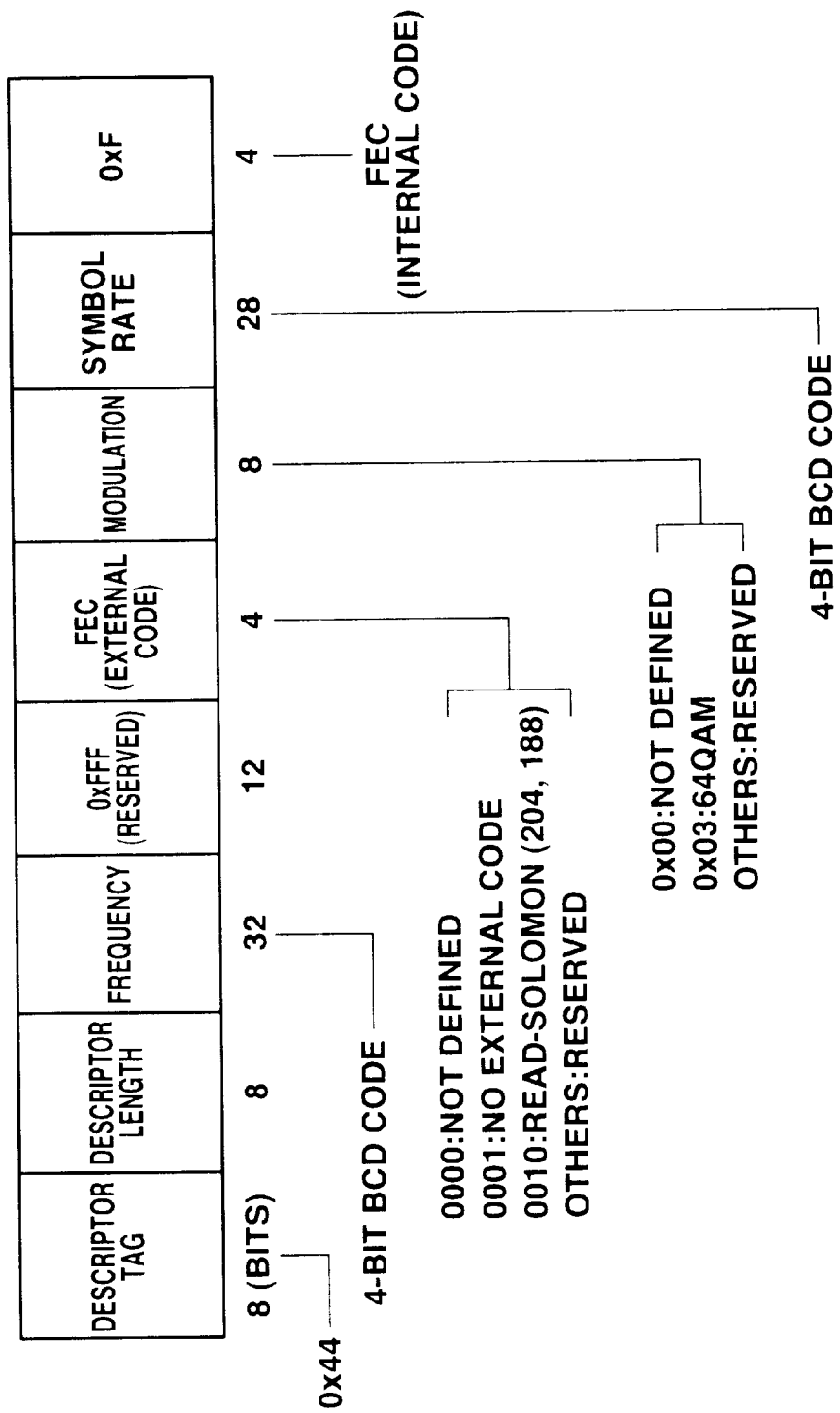
FIG. 9 is a diagram representing the structure of the cable-delivery system descriptor.

FIG. 9 represents the structure of the cable-delivery system descriptor. The descriptor tag, which designates the type of the descriptor, is defined by the DVB system and is "0x44". Frequency indicates the frequency of one stream (i.e., one channel in the CATV system). FEC (external code) indicates the external code that is being used. Usually it is "0010", representing a Read-Solomon code. Those parts of this satellite-delivery system descriptor, which are identical to those of the satellite-delivery system descriptor, will are not described here.

The service list descriptor will be described. This descriptor shows the ID of the service that is multiplex on the stream (one transponder in the satellite broadcasting, or one channel in the CATV system).

Figure 10:
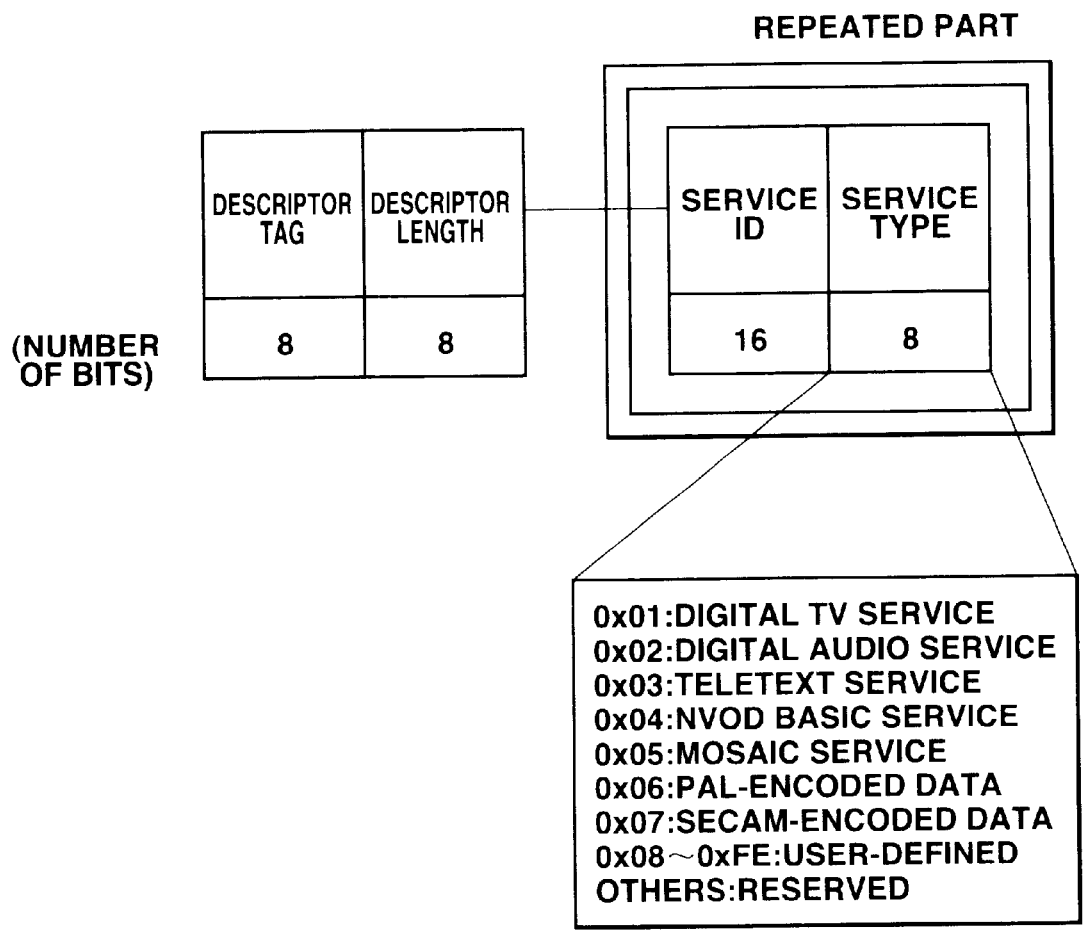
FIG. 10 is a diagram showing the structure of the service list descriptor.

FIG. 10 shows the structure of the service list descriptor. Descriptor tag, which indicates the type of the descriptor, is defined in the DVB system and is "0x41". Service ID identifies the service. Service type indicates the contents of the service.

Figure 11:
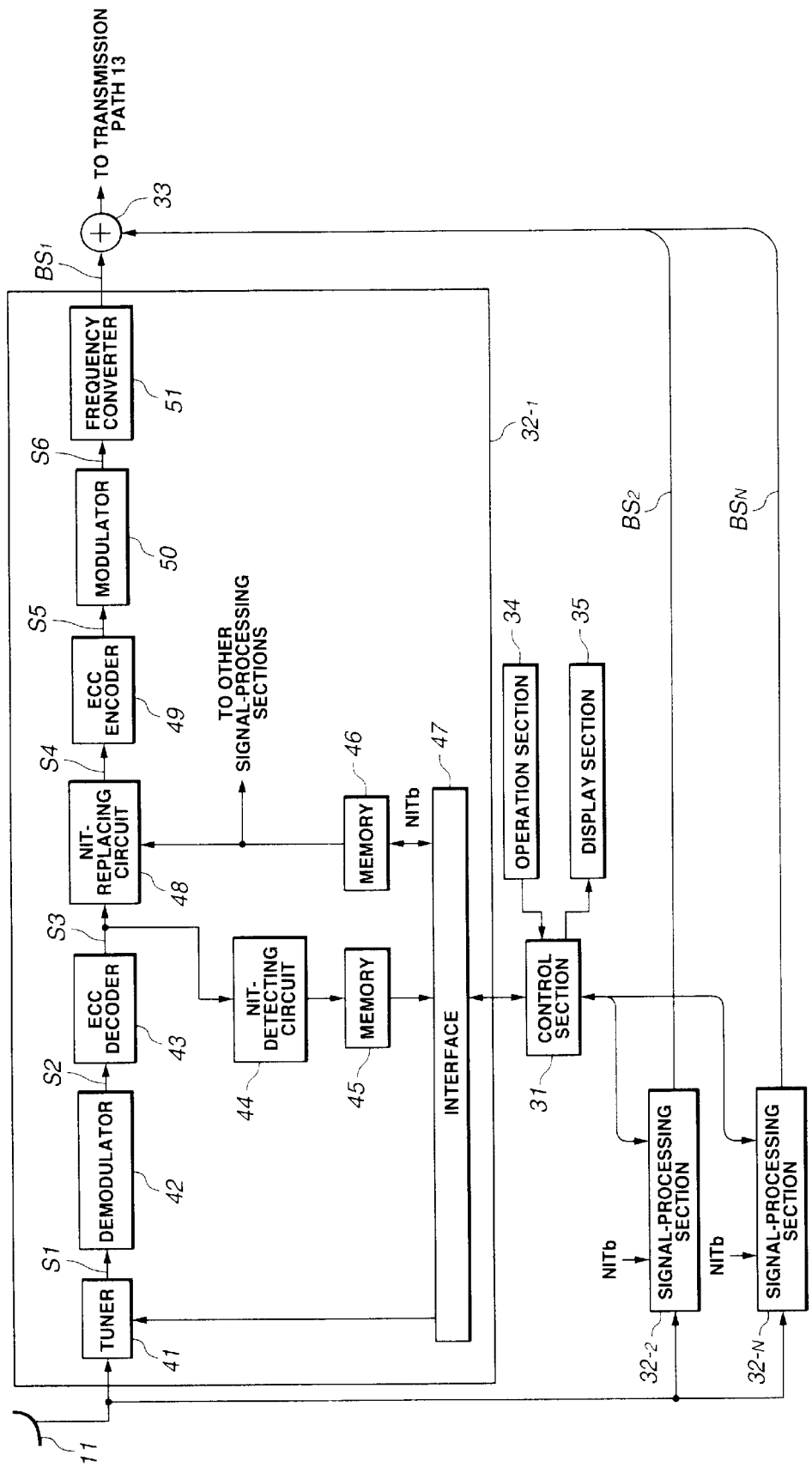
FIG. 11 is a block diagram illustrating the modulator-converter-transmitter incorporated in the digital CATV system.

FIG. 11 illustrates the modulator-converter-transmitter 12 incorporated in the digital CATV system 10. The transmitter 12 receives digital broadcast signals from the first to Nth transponders (satellite relays) provided in the communications satellite 20. It changes the transmission frequency and modulation mode of each digital broadcast signal. In addition, the transmitter 12 replaces the satellite-delivery system descriptor in the NIT with a cable-delivery system descriptor, thus generating a CATV digital broadcast signal. The transmitter 12 transmits the CATV digital broadcast signal to the transmission path 13.

The transmitter 12 has a microcomputer. It comprises a control section 31, first to Nth signal-processing sections 32-1 to 32-N, and a mixer 23. The control section 31 controls the other components of the transmitter 12. The sections 32-1 to 32-N process the digital broadcast signal of SHF (Super High Frequency) band, transmitted from the transponders of the communications satellite 20, thereby generating CATV digital broadcast signals BS1 to BSN. The mixer 23 mixes the digital broadcast signals BS1 to BSN and supplies them to the transmission path 13. To the control section 31 there are connected an operation section 34 and a display section 35. The operation section 34 is operated to set reception frequencies for the tuners provided in the signal-processing sections 32-1 to 32-N. The display section 35 displays the operation state of the transmitter 12.

As shown in FIG. 12, the display section 35 displays the information about the satellite. More precisely, the section 35 displays the information about the transmission path of the NIT designed for the satellite broadcasting (i.e., information in the satellite-delivery descriptor), which is processed by the control section 31, and the service ID (i.e., information in the service list descriptor), which identifies the program being broadcast. Further, the display section 35 displays the information (i.e., information in the cable-delivery system descriptor) about the transmission path for the NIT generated by the control section 31 and designed for the CATV system. The section 35 also displays the service ID to be transmitted to the cable. The display section 35 displays streams, side by side, so that the user may easily compare these items of information.

The signal-processing section 32-1 comprises a tuner 41, a demodulator 42, and an ECC (Error Correction Code) decoder 43. The tuner 41 selects the digital broadcast signal transmitted from the first transponder of the communications satellite 20, from among the SHF-band digital broadcast signals the antenna 11 has received, thus obtaining a QSPK-modulated signal S1. The demodulator 42 demodulates the QSPK-modulated signal S1, generating a DVB-frame signal S2. The ECC decoder 43 corrects the error in the DVB-frame signal S2, generating an MPEG2 transport packet S3, which is digital broadcast data.

The signal-processing section 32-1 has an NIT-detecting circuit 44, a memory 45, and a memory 46. The NIT-detecting circuit 44 detects the NIT from each of the MPEG2 transport packets S3 the ECC decoder 43 outputs one after another. The memory 45 stores the table NITa the NIT-detecting circuit 44 has detected. The memory 46 stores the table NITb that has been generated by changing the table NITa stored in the memory 45 and which can be used in the CATV system. The NIT-detecting circuit 44 detects an NIT in accordance with the PID assigned to the transport packet.

The control section 31 analyzes the table NITa detected by the NIT-detecting circuit 44 and stored in the memory 45. As the result of analysis, the control section 31 acquires detailed information including the number of the transponders provided in the satellite, the transmission frequency and the service multiplexed on the transport stream transmitted of each transponder.

The control section 31 holds the information about a CATV system to which broadcast data is to be delivered.

More precisely, in the control section 31 there is set the information showing which transponder provided in the satellite should be transmitted to which CATV channel and which service multiplexed in that channel should be delivered to the CATV. Based on this information, the NITa for the satellite is changed to NITb for the CATV system.

Figure 13:
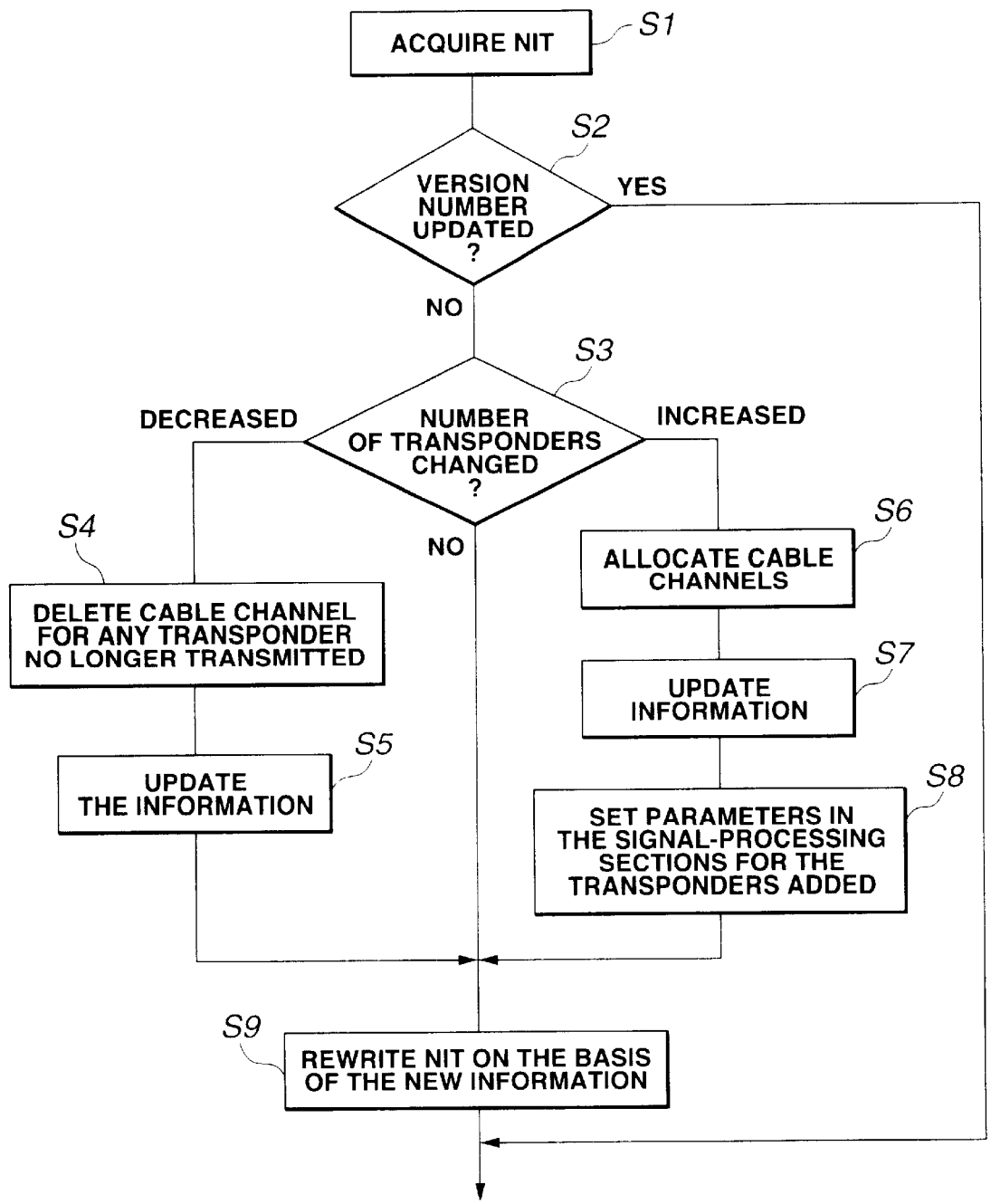
FIG. 13 is a flowchart illustrating how the NIT is analyzed and set by the control section provided in the modulator-converter-transmitter.

If the number of the transponders to be transmitted may change by some cause and becomes different from the number of transponders described in the information the control section 31 holds. This makes it impossible to change the NITa for the satellite to NITb for the CATV system. In such a case, the control section 31 analyzes again the NITa transmitted from the satellite, by performing the sequence of operations shown in the flowchart of FIG. 13. The control section 31 thereby finds the difference between the difference between the previous information and the present information and automatically generates new information such as the satellite-CATV frequency table of FIG. 14B or the delivery satellite-CATV delivery service table of FIG. 14B.

That is, the control section 31 acquires an NIT (Step S1), determines whether the version number contained in the NIT has been updated or not (Step S1). If the version number has been updated, the control section 31 determines whether the number of transponders has changed or not (Step S3).

If the number of transponders has decreased, the control section 31 deletes the data about the cable channel that corresponds to any transponder which is no longer transmitted (Step S4). Then, the section 31 updates the information, whereby the information shows that the data about that cable channel has been deleted (Step S5). Hence, no data for that cable channel is delivered to the CATV. If the number of transponders has increased, the control section 31 allocates a cable channel to any transponder added, so that the digital broadcast data transmitted from the transponder may be delivered to the CATV (Step S6). Then, the section 31 generates new information, updating the NIT (Step S7). Further, the control section 31 controls, via an interface 47, those of the signal-processing sections 32-1 to 32-N that have been reserved, thus making them operate normally (Step S8). The digital broadcast data transmitted from any transponder added may not be delivered to the CATV. In this case, the control section 31 updates the information set and rewrites the NIT on the basis of the new information (Step S9).

The number of services multiplexed in the transport stream transmitted from a transponder may increase or decrease. In this case, too, the control section 31 automatically updates the information in the same way as in the case where the number of transponders increases or decreases. Then, the section 31 rewrites the NIT on the basis of the information thus updated.

As described above, the NIT for the digital broadcast data transmitted from the satellite 20 has the structure illustrated in FIG. 7. The table NITa detected by the NIT-detecting circuit 44 has a similar structure. To acquire the table NITb, the control section 31 changes the satellite delivery system descriptor contained in the table NITa, to a cable delivery system descriptor.

Data is written into and read from the memories 45 and 46 under the control of the control section 31, which is accomplished via the interface 47. The reception frequency of the tuner 41 is controlled via the interface 47 by the control section 31, too.

The signal-processing section 32-1 has an NIT-replacing circuit 48. The circuit 48 is designed to detect NITs from the MPEG2 transport packets S3 that are sequentially output from the ECC decoder 43 and to replace each NIT with the table NITb stored in the memory 46. The NIT-replacing circuit 48 detects NITs on the basis of the fixed PID.

The signal-processing section 32-1 has an ECC encoder 49, a modulator 50, and a frequency converter 51. The ECC encoder 49 add an error-correcting code of Read Solomon (204, 188) to any MPEG2 transport packet S4 in which the NIT has been replaced by the NIT-replacing circuit 48, thereby generating a signal S5 (see FIG. 2B) of the DVB-frame configuration. The modulator 50 is designed to perform 64 QAM (Quadrature Amplitude Modulation) on the signal S5 of the DVB-frame configuration. The frequency converter 51 converts the frequency of the 64 QAM-modulated signal output from the modulator 50, thus generating a CATV digital broadcast signal BS1 of either VHF band or UHF band.

The other signal-processing sections 32-2 to 32-N are identical in structure. Each comprises a tuner 41, a modulator 42, an ECC decoder 43, an interface 47, an NIT-replacing circuit 48, an ECC encoder 49, a modulator 50 and a frequency converter 51. The NIT-replacing circuit 48 provided in each of the signal-processing sections 32-2 to 32-N replaces the NIT by using the table NITb that is stored in the memory 46 of the signal-processing section 32-1. The tuner 41 provided in each of the signal-processing sections 32-2 to 32-N selects one of the digital broadcast signals transmitted from the second to Nth transponders of the communications satellite 20. The digital broadcast signal selected is frequency-converted to a QPSK-modulated signal S1. The control section 31 controls, via the interface 47, the reception frequency of the tuner 41 provided in each of the signal-processing sections 32-2 to 32-N. In the signal-processing sections 32-2 to 32-N, the frequency converters 51 convert the frequencies of the modulated signals, so that the digital broadcast signals BS1 to BSN may have different transmission frequencies.

In the digital CATV system 10 described above, the NIT-detecting circuit 44 provided in the modulator-converter-transmitter 12 detects the NITa from the MPEG2 transport packet that is digital broadcast data in the satellite broadcasting system (first network). The control section 31 acquires at least the NITb which complies with the CATV (second network) and which information representing the transmission frequency of the NITa. The NIT-replacing circuit 48 replaces the NITa for the MPEG2 transport packet, i.e., the digital broadcast data in the satellite broadcasting system, with the NITb. An MPEG2 transport packet that is used as digital broadcast data in the CATV is thereby generated. Hence, digital multi-channel broadcast programs can be delivered in the CATV system.

In modulator-converter-transmitter 12, the display section 35 displays the contents described in the NITa and the contents described in the NITb, the NITa for use in the first network having been replaced by the NITb for the use in the second network, by means of each of the signal-processing sections 32-1 to 32-N. It is therefore easy for the user to know whether NITs have been correctly replaced in the signal-processing sections 32-1 to 32-N. If any NIT has not been correctly replaced, the user may immediately take necessary steps to replace it with another.

The digital broadcasting achieved via the communications satellite 20 may be changed for some reason. Even in this case, the contents of the NITa detected by the NIT-detecting circuit 44 are read by analyzing the NITa by means of the control section 31. The information set in the NITa is thereby automatically undated to new information. The NIT is thus changed on the basis of the new information. The NIT-replacing circuit 48 replaces the NITa with the NITb. This makes it possible to deliver the new digital broadcast data to the CATV system.

In the signal processing apparatus according to the present invention, the first frequency-converting means converts the frequency of the first digital broadcast signal having a prescribed transmission frequency on a first network, thereby to generate a first digital modulated signal. The first frequency-converting means converts the frequency of the first digital, thereby generating digital broadcast data. The table-detecting means detects a network information table, which is physical information about a transmission path, from the digital broadcast data. The table-changing means changes at least transmission frequency data contained in the network information table, to data that complies with the second network. The table-replacing means replaces the network information table supplied from the demodulating means, with the network information table supplied from the table-changing means, thereby generating digital broadcast data that complies with the second network. The modulating means modulates this digital broadcast data, thereby generating a second digital modulated signal. The second frequency-converting means converts the frequency of the second digital broadcast signal, thereby to generate the second digital broadcast signal. Therefore, the apparatus can convert a first digital broadcast having a prescribed transmission frequency on a first network, to a second digital broadcast signal having a prescribed frequency on a second network, and deliver the second digital broadcast signal.

In the signal processing apparatus, the display means displays the contents described in the network information table of the digital broadcast data demodulated by the demodulating means and complying with the first network, and also the contents described in the network information table replaced by the table-converting means and complying with the second network. It is therefore easy for the user to confirm the relation between the physical data and service data transmitted in a first network and the physical data and service data transmitted in a second network.

In the present invention, the network information table of the first network is analyzed and compared with the network information table analyzed previously. If the network information table differs from the previously analyzed on, the information is automatically changed to new information. The network information table is changed on the basis of the new information. The network information table about digital broadcast data is replaced by the new network information table of the second first network. Hence, the changes made in the first network can be automatically applied to the second network.

What is claimed is:

1. A signal processing apparatus for converting a first digital broadcast having a prescribed transmission frequency on a first network, to a second digital broadcast signal having a prescribed frequency on a second network, characterized by comprising:

first frequency-converting means for converting the frequency of the first digital broadcast signal, thereby to generate a first digital modulated signal;

demodulating means for demodulating the first digital modulated signal supplied from the first frequency-converting means, thereby to generate digital broadcast data;

table-detecting means for detecting a network information table which is physical information about a transmission path, from the digital broadcast data supplied from the demodulating means;

table-changing means for changing at least transmission frequency data contained in the network information table detected by the table-detecting means, to data that complies with the second network;

table-replacing means for replacing the network information table supplied from the demodulating means, with the network information table supplied from the table-changing means;

display means for displaying the contents described in the network information table of the digital broadcast data supplied from the demodulating means and complying with the first network, and also the contents described in the network information table of the digital broadcast data changed by the table-changing means and complying with the second network;

modulating means for modulating the digital broadcast data whose network information table has been replaced by the table-replacing means, thereby to generate a second digital modulated signal; and second frequency-converting means for converting the frequency of the second digital broadcast signal, thereby to generate the second digital broadcast signal.

2. The signal processing apparatus according to claim 1, characterized in that the display means displays, at the same time, both the contents described in the network information table of the digital broadcast data complying with the first network and also the contents described in the network information table of the digital broadcast data complying with the second network.

3. A signal processing apparatus for converting a first digital broadcast having a prescribed transmission frequency on a first network, to a second digital broadcast signal having a prescribed frequency on a second network, characterized by comprising:

- first frequency-converting means for converting the frequency of the first digital broadcast signal, thereby to generate a first digital modulated signal;
- demodulating means for demodulating the first digital modulated signal supplied from the first frequency-converting means, thereby to generate digital broadcast data;
- table-detecting means for detecting a network information table which is physical information about a transmission path, from the digital broadcast data supplied from the demodulating means;
- analyzing means for analyzing information about the first network, on the basis of the network information table detected by the table-detecting means;
- comparing means for comparing the information about the first network analyzed by the analyzing means, with the previous information about the first network;
- table-changing means for changing the network information table of the first network to one that complies with the second network, on the basis of the information about the first network, which has been generated as results of comparison accomplished by the comparing means;
- table-replacing means for replacing the network information table supplied from the demodulating means, with the network information table supplied from the table-changing means;
- modulating means for modulating the digital broadcast data whose network information table has been replaced by the table-replacing means, thereby to generate a second digital modulated signal; and
- second frequency-converting means for converting the frequency of the second digital broadcast signal, thereby to generate the second digital broadcast signal.

4. The signal processing apparatus according to claim 3, characterized in that, when the information about the first network, generated as results of comparison accomplished by the comparing means, shows that transport streams to be transmitted have increased in numbers, the table-changing means changes the network information table of the first network to one that complies with the second network, on the basis of the formation about additional transport streams.

5. The signal processing apparatus according to claim 4, characterized in that the table-changing means changes the network information table so that the transmission frequency contained in the information about any additional transport stream is allocated to one of the transmission frequencies reserved for the second network and not used.

6. The signal processing apparatus according to claim 3, characterized in that, when the information about the first network, generated as results of comparison accomplished by the comparing means, shows that transport streams to be transmitted have increased in numbers, the table-changing means changes the network information table so that the information about any additional transport stream is excluded from the network information table of the first network.

7. The signal processing apparatus according to claim 3, characterized in that, when the information about the first network, generated as results of comparison accomplished by the comparing means, shows that transport streams to be transmitted have decreased in numbers, the table-changing means changes the network information table of the first network to one that complies with the second network, on the basis of the formation about deleted transport streams.

8. The signal processing apparatus according to claim 3, characterized in that, when the information about the first network, generated as results of comparison accomplished by the comparing means, shows that service data items contained in a transponder stream have increased in numbers, the table-changing means changes the network information table of the first network to one that complies with the second network, on the basis of the formation about additional services.

9. The signal processing apparatus according to claim 3, characterized in that, when the information about the first network, generated as results of comparison accomplished by the comparing means, shows that service data items contained in a transponder stream have increased in numbers, the table-changing means changes the network information table of the second network so that any additional service item contained in the transponder strewn is excluded from the network information table of the second network.

10. The signal processing apparatus according to claim 3, characterized in that, when the information about the first network, generated as results of comparison accomplished by the comparing means, shows that service data items contained in a transponder stream have decreased in numbers, the table-changing means changes the network information table of the first network to one that complies with the second network, on the basis of the formation about deleted services.

11. A signal processing method for converting a first digital broadcast having a prescribed transmission frequency on a first network, to a second digital broadcast signal having a prescribed frequency on a second network, characterized by comprising:

- a first frequency-converting step of converting the frequency of the first digital broadcast signal, thereby to generate a first digital modulated signal;
- a demodulating step of demodulating the first digital modulated signal generated in the first frequency-converting step, thereby to generate digital broadcast data;
- a table-detecting step of detecting a network information table which is physical information about a transmission path, from the digital broadcast data generated in the demodulating step;
- analyzing step of analyzing information about the first network, on the basis of the network information table detected in the table-detecting step;
- comparing step of comparing the information about the first network analyzed by in the analyzing step, with the previous information about the first network;
- table-changing step of changing the network information table of the first network to one that complies with the second network, on the basis of the information about the first network, which has been generated as results of comparison accomplished in the comparing step;
- table-replacing step of replacing the network information table generated in the demodulating step, with the network information table generated in the table-changing step;
- modulating step of modulating the digital broadcast data whose network information table has been replaced in the table-replacing step, thereby to generate a second digital modulated signal; and second frequency-converting step for converting the frequency of the second digital broadcast signal, thereby to generate the second digital broadcast signal.

12. The signal processing method according to claim 11, characterized in that, when the information about the first network, generated as results of comparison accomplished in the comparing step, shows that transport streams to be transmitted have increased in numbers, the network information table of the first network is changed, to one that complies with the second network, in the table-changing step on the basis of the formation about additional transport streams.

13. The signal processing method according to claim 12, characterized in that the network information table is changed, in the table-changing step, so that the transmission frequency contained in the information about any additional transport stream is allocated to one of the transmission frequencies reserved for the second network and not used.

14. The signal processing method according to claim 11, characterized in that, when the information about the first network, generated as results of comparison accomplished in the comparing step, shows that transport streams to be transmitted have increased in numbers, the network information table is changed, in the table-changing changing step, so that the information about any additional transport stream is excluded from the network information table of the first network.

15. The signal processing method according to claim 11, characterized in that, when the information about the first network, generated as results of comparison accomplished in the comparing step, shows that transport streams to be transmitted have decreased in numbers, the network information table of the first network is changed to one that complies with the second network, in the table-changing step on the basis of the formation about deleted transport streams.

16. The signal processing method according to claim 11, characterized in that, when the information about the first network, generated as results of comparison accomplished in the comparing step, shows that service data items contained in a transponder stream have increased in numbers, the network information table of the first network is changed to one that complies with the second network, in the table-changing step, on the basis of the formation about additional services.

17. The signal processing method according to claim 11, characterized in that, when the information about the first network, generated as results of comparison accomplished in the comparing step, shows that service data items contained in a transponder stream have increased in numbers, the network information table of the second network is changed in the table-changing step so that any additional service item contained in the transponder stream is excluded from the network information table of the second network.

18. The signal processing method according to claim 11, characterized in that, when the information about the first network, generated as results of comparison accomplished in the comparing step, shows that service data items contained in a transponder stream have decreased in numbers, the network information table of the first network is changed to one that complies with the second network, in the table-changing step on the basis of the formation about deleted services.

* * * * *